United States Patent [19]

Mitomo et al.

[11] Patent Number: 4,643,859

[45] Date of Patent: Feb. 17, 1987

[54] PROCESS FOR THE PRODUCTION OF FINE NON-OXIDE POWDERS FROM ALKOXIDES

[75] Inventors: Mamoru Mitomo, Ibaraki; Yuji Yoshioka, Higashikurume, both of Japan

[73] Assignee: National Institute for Researches in Inorganic Materials, Ibaraki, Japan

[21] Appl. No.: 788,577

[22] Filed: Oct. 17, 1985

[30] Foreign Application Priority Data

Jan. 26, 1985 [JP] Japan .................................. 60-13139
Feb. 5, 1985 [JP] Japan .................................. 60-20677
Feb. 9, 1985 [JP] Japan .................................. 60-23978

[51] Int. Cl.$^4$ ............................................... F27B 9/04
[52] U.S. Cl. .......................... 264/65; 156/DIG. 61; 156/DIG. 64; 156/DIG. 99; 264/125; 264/332; 501/89; 501/88; 501/90; 501/92; 501/97; 501/98; 501/153; 501/154
[58] Field of Search ................... 501/97, 98, 153, 154, 501/87, 88, 89, 90, 92; 264/65, 125, 332; 156/DIG. 64, DIG. 99, DIG. 61; 423/409, 412, 344

[56] References Cited

U.S. PATENT DOCUMENTS 4,010,233 3/1977 Winter et al. .......................... 501/97
4,535,063 8/1985 Matsuhiro et al. .................... 501/97
4,558,018 12/1985 Matsuhiro et al. .................... 501/97

OTHER PUBLICATIONS

G. Schwier, *On the Preparation of Fine Silicon Nitride Powders*, "Progress in Nitrogen Ceramics", (Proceedings of the NATO Advanced Study Institute) editor F. L. Riley, (Martinus Niihoff Pub. 1983) p. 157.
M. Hoch et al., Preparation and Characterization of Ultrafine Powders of Refractory Nitrides: I, AIN and $Si_3N_4$, American Ceramic Society Bulletin, p. 87, vol. 58 (1979).

*Primary Examiner*—Stephen J. Lechert, Jr.
*Attorney, Agent, or Firm*—Oblon, Fisher, Spivak, McClelland, & Maier

[57] ABSTRACT

A process for producing fine non-oxide powder from an alkoxide selected from the group consisting of a silicon alkoxide and an aluminum alkoxide, which comprises dispersing carbon powder in the alkoxide, hydrolyzing the dispersion, and heating the hydrolyzate mixture thereby obtained, in a nitrogen atmosphere at a temperature of from 1350° C. to 1650° C. for from 30 minutes to 30 hours.

13 Claims, No Drawings

PROCESS FOR THE PRODUCTION OF FINE NON-OXIDE POWDERS FROM ALKOXIDES

BACKGROUND OF THE INVENTION

1. Field of the Invention

The present invention relates to a process for producing fine non-oxide powder from an alkoxide such as a silicon or aluminum alkoxide. More particularly, the present invention relates to a process for producing fine powder of silicon or aluminum nitride or a fine powder mixture of silicon nitride and silicon carbide, which is useful as a starting material for a sintered product.

2. Description of the Prior Art

A sintered product of silicon nitride has high strength and high thermal shock resistance, and it is expected to be applied to heat resistant machine parts such as automobile engine parts or gas turbine parts. If this is put into practice, the engines or turbines can be operated without requiring a cooling system, which will greatly contribute to the saving of energy.

A sintered product of aluminum nitride has high corrosion resistance and good heat conductivity, and it is expected to be applied to machine parts for metal refining or heat-resistant substrates for semiconductors.

A sintered product of silicon carbide has high strength and good heat conductivity. However, the sintering of silicon carbide requires a high temperature of at least 2000° C. On the other hand, silicon nitride can be sintered at a temperature of 1750° C. or lower, and the sintered product has high strength. However, the heat conductivity of the sintered product of silicon nitride is low as compared with the sintered product of silicon carbide. Whereas, a sintered product of a mixture of silicon nitride and silicon carbide has high strength and good heat conductivity. Such a sintered product is useful for high temperature heat exchangers or heat resistant substrates for semiconductors.

For the production of fine powder of silicon nitride, there have been known:

(1) a method in which metal silicon is heated in a nitrogen stream at a temperature of from 1300° to 1400° C.;

(2) a method in which a powder mixture of silica and carbon is heated in a nitrogen stream at a temperature of from 1400° to 1500° C.

(3) a method in which a Si-containing gas and a carbon-containing gas are reacted in a gaseous phase at a temperature of from 1300° to 1600° C.; and (4) a method in which $SiCl_4$ and $NH_3$ are reacted in a solvent at a low temperature, and the resulting $Si(NH)_2$ is heated.

The above method (1) is used on an industrial scale. However, it has drawbacks that it is necessary to use iron or manganese as a catalyst for nitriding, and it is difficult to obtain highly pure powder.

According to the method (2), it is possible to obtain highly pure silicon nitride powder by using highly pure silica. However, it is difficult to obtain a uniform mixture of silica and carbon, and accordingly, a great amount of carbon as much as from 3 to 10 times the theoretical amount is required to complete the reaction. Therefore, it is necessary to remove excess carbon after the reaction by heating the reaction product in air at a temperature of from 700° to 800° C. This brings about a drawback that the surface of silicon nitride powder is oxidized.

Thus, according to the methods (1) and (2), the silicon nitride powder contains metal or non-metal (oxygen) as impurities. If such powder is sintered, the impurities tend to precipitate at the boundaries of silicon nitride particles and thus impair the high temperature strength, oxidation resistance and corrosion resistance.

According to the methods (3) and (4), it is possible to obtain highly pure fine powder. However, such fine powder particles are likely to firmly bond one another to form large particles (agglomerates). Such agglomerates act as large particles during the sintering, and accordingly they have the same drawbacks as those of large particles. Further, the powder is expensive.

For the production of aluminum nitride, there have been known:

(1) a direct-nitriding method in which aluminum is heated in nitrogen;

(2) a reduction-nitriding method in which a mixture of alumina and carbon is heated in nitrogen at a temperature of from 1600° to 2000° C.; and (3) a gaseous phase reaction method in which an aluminum compound (gas) and nitrogen or ammonia are reacted.

The above method (1) has an advantage that the aluminum nitride powder is produced inexpensively by the direct nitriding method. However, it is difficult to completely nitride highly pure aluminum metal, and it is necessary to add other metals as a nitriding catalyst. Consequently, the metal of the added nitriding catalyst will remain in the formed aluminum nitride powder, and it is difficult to obtain highly pure aluminum nitride powder.

The reduction-nitriding method (2) does not require a catalyst for the reaction, and accordingly, it is possible to obtain highly pure powder. However, it is difficult to uniformly mix the starting material powder, and it is necessary to add a large excess amount of carbon powder in order to complete the reaction. Accordingly, it will be required to remove the remaining carbon after the reaction, by after-treatment such as heating in air. For the removal of a large amount of carbon, heating for a long period of time is required, whereby aluminum nitride is likely to be oxidized.

According to the gaseous phase reaction method (3), it is possible to obtain highly pure fine powder. However, the starting material is expensive and a large scale apparatus will be required. Thus, the method has a drawback that the resulting powder is expensive.

For the production of a powder mixture of silicon nitride and silicon carbide, there have been known:

(1) a method in which powders of silicon nitride and silicon carbide having a particle size of at most 1 μm are mixed; and (2) a method in which a mixture of silica and carbon is heated in an atmosphere of nitrogen and carbon monoxide.

However, according to the method (1), it is difficult to obtain a uniform mixture. Accordingly, the sinterability of the powder will be inadequate, and there is a drawback that it is difficult to obtain a high density sintered product even by hot-pressing.

According to the method (2), it is necessary to add a great amount of carbon in order to complete the reaction. Consequently, a substantial amount of carbon will remain in the powder mixture. Such a mixture hardly sinters even when a sintering aid is added. Therefore, it is necessary to conduct after-treatment for the removal of the excess carbon e.g. by heating in air. This not only makes the operation cumbersome, but also adds to the cost.

SUMMARY OF THE INVENTION

Under these circumstances, it is an object of the present invention to overcome the above-mentioned drawbacks and to provide a process for efficiently producing non-oxide powder, such as silicon or aluminum nitride powder or a powder mixture of silicon nitride and silicon carbide, having a particle size of at most 1 μm, which is suitable for use as a starting material for a sintered product.

As a result of extensive researches, it has been found that the above object may be attained by a process for producing fine non-oxide powder from an alkoxide selected from the group consisting of a silicon alkoxide and an aluminum alkoxide, which comprises dispersing carbon powder in the alkoxide, hydrolyzing the dispersion, and heating the hydrolyzate mixture thereby obtained, in a nitrogen atmosphere at a temperature of from 1350° C. to 1650° C. for from 30 minutes to 30 hours.

DETAILED DESCRIPTION OF THE INVENTION

According to the first embodiment of the present invention, carbon powder is dispersed in a silicon alkoxide, the dispersion thereby obtained is hydrolyzed, and the resulting mixture of silica and carbon is then heated in a nitrogen atmosphere at a temperature of 1350° to 1550° C. for from 1 to 30 hours, or carbon powder and non-oxide ceramics powder are dispersed in a silicon alkoxide, the dispersion thereby obtained is hydrolyzed, and the resulting mixture of silica, carbon and non-oxide ceramics is heated in a nitrogen atmosphere at a temperature of 1350° to 1550° C. for from 1 to 10 hours, whereby fine uniform powder of silicon nitride having a particle size of at most 1 μm and containing not more than 0.1% by weight of metal impurities and not more than 1.5% by weight of oxygen and carbon, is obtainable.

The first embodiment of the invention is based on the following discoveries:

(1) When carbon powder, preferably fine carbon powder having a particle size of at most 0.1 μm, was dispersed in a silicon alkoxide, and the dispersion thereby obtained was hydrolyzed to form a powder mixture of silica and carbon, it is possible to readily obtain a mixture of highly pure silica and carbon uniformly mixed and having a particle size of not more than 0.1 μm.

Namely, a highly pure silicon alkoxide can readily be obtained by distillation. On the other hand, fine powder of carbon containing no substantial metal impurities is available at a low cost. Thus, a highly pure mixture is obtainable. Silica precipitates on dispersed fine carbon particles, whereby a uniform mixture of fine particles having a particle size of at most 0.1 μm is obtainable.

(2) The reaction will readily be completed by using the uniformly mixed fine starting materials. It is unnecessary to use a great amount of carbon as much as from 3 to 10 times as required in the conventional methods. It is likewise unnecessary to conduct treatment for removal of carbon remaining after the reaction as required in the case where a great amount of carbon is used.

(3) Since a uniform mixture of fine particles having a particle size of at most 0.1 μm is obtainable, it is possible to complete the reaction at a low temperature of not higher than 1550° C., and it is possible to obtain fine powder of silicon nitride having a particle size of at most 1 μm.

(4) When a powder of non-oxide ceramics such as SiC, Si$_3$N$_4$, AlN, TiN or TiC is dispersed together with carbon powder, it is possible to obtain a uniform mixture of carbon and non-oxide ceramics having silica uniformly precipitated on their surface. The non-oxide ceramics facilitate the diffusion of nitrogen gas and the discharge rate of the formed CO gas, and thus have a function to shorten the reaction time. Yet, if the amount is within a certain range, it does not deteriorate the sinterability of the silicon nitride powder or the properties of the sintered product.

As the starting material of silicon alkoxide, there may be mentioned methyl silicate, ethyl silicate, propyl silicate or butyl silicate. As the carbon powder, it is preferred to employ a highly pure carbon powder having a particle size of at most 0.1 μm. If the particle size exceeds 0.1 μm, it becomes difficult to obtain uniform fine mixture. The amount of carbon dispersed in the silicon alkoxide is preferably within a range of from 1.7 to 2.1 in the molar ratio of carbon to the silicon alkoxide.

Silica and carbon react in nitrogen in accordance with the following reaction formula, whereby silicon nitride will be formed.

$$3SiO_2 + 6C + 2N_2 \rightarrow Si_3N_4 + 6CO \tag{1}$$

In this case, the following reaction takes place simultaneously, whereby SiO gas is formed, and the silica component is discharged out of the system.

$$SiO_2 + C \rightarrow SiO + CO \tag{2}$$

In the reaction of the formula (2), silica and carbon react with each other in the ratio of 1:1. Therefore, if the amount of carbon is determined in accordance with the formula (1), an excess amount of carbon will remain in the resulting silicon nitride powder. The reaction of the formula (2) does not take place substantially at a low temperature, but it becomes substantial at a high temperature. Accordingly, the amount of carbon is controlled taking into consideration the relation between the heating conditions and the reaction of the formula (2). Namely, the molar ratio of carbon to silica is selected within a range of from 1.9 to 2.1 within a heating temperature range of from 1350° to 1400° C., and from 1.7 to 2.0 within a heating temperature range of from 1450° to 1550° C. Thus, the amount of carbon is reduced with an increase of the temperature.

The silicon alkoxide produces silica by the hydrolysis in a yield of at least 99.8%, and accordingly, the molar ratio of carbon to the silicon alkoxide should preferably be within the above-mentioned range.

After adding carbon to the silicon alkoxide in such a ratio, and uniformly dispersing carbon by e.g. ultrasonic vibration, distilled water is added in an amount of from 3 to 4 times by weight of the silicon alkoxide, and mixed for about 2 hours. Then, an acid such as hydrochloric acid or nitric acid or an aqueous alkaline solution such as aqueous ammonia is dropwise added in a small amount, and then the mixture is heated at a temperature of 80° C. for 5 hours to complete the hydrolysis. Water and the alcohol are separated by heating the mixture at a temperature of from 50° to 90° C. under a reduced pressure of from 10 to 200 Torr, whereby a uniform mixture of silica and carbon is obtained. The mixture has a particle size of at most 0.1 μm, and is amorphous, as confirmed by the X-ray diffraction. From the chemical analysis, the Si/C ratio was found to correspond to the corresponding ratio of the starting materials with the accuracy of ±1%.

The mixture thereby obtained was put in a mold, and molded into a disc under a pressure of e.g. 300 kg/cm². The disc is heated in a nitrogen stream at a temperature of from 1350° to 1550° C. for from 1 to 30 hours, whereby fine powder of silicon nitride is obtained. If the heating temperature is lower than 1350° C., it takes a long time for the reaction. On the other hand, if the temperature exceeds 1550° C., the reaction of the above formula (2) will be great, scattering of the starting material increases, and the control of the remaining carbon will be difficult. For these reasons, the temperature should preferably be from 1350° to 1550° C., more preferably from 1400° to 1500° C. The lower the temperature, the longer the heating time required. Therefore, the heating time is preferably from 1 to 30 hours. For instance, it is preferably from 5 to 20 hours at a temperature of 1400° C., and from 2 to 5 hours at a temperature of 1500° C.

The resulting powder is fine particles having a particle size of from 0.05 to 1.0 μm, and contains not more than 0.1% by weight of metal impurities and not more than 1.5% by weight of oxygen and carbon.

In the case where non-oxide ceramics powder is dispesed together with carbon powder into the silicon alkoxide, the same procedure as described above may be employed except for the dispersion of the non-oxide ceramics powder.

In this case, by the presence of the non-oxide ceramics powder, the diffusion of the nitrogen gas and the dispersion of the formed CO gas out of the system are facilitated, whereby the reaction time will be shortened to a level of from 1 to 10 hours. As such non-oxide ceramics, there may be mentioned, for instance, SiC, $Si_3N_4$, AlN, TiN and TiC, and their particles size is preferably at most 1 μm. The amount is preferably from 1 to 5% by weight relative to the silica formed by the hydrolysis. If the amount is less than 1% by weight, the effectiveness will be less. On the other hand, if the amount exceeds 5% by weight, the sinterability of the silicon nitride powder will be lowered, or the mechanical and thermal properties of the sintered product will be impaired. For these reasons, the amount is preferably within the above-mentioned range.

According to the second embodiment of the present invention, an aluminum alkoxide is dissolved in an organic solvent, carbon powder is dispersed in the solution of the aluminum alkoxide, water is added to the solution to hydrolyze the aluminum alkoxide, a powder mixture of aluminum hydroxide or alumina and carbon thereby obtained is heated in a nitrogen atmosphere at a temperature of from 1400° to 1650° C. for from 1 to 30 hours, whereby fine uniform powder of aluminum nitride having a particle size of at most 1 μm containing not more than 2% of excess carbon and no unreacted substance is readily prepared.

This second embodiment of the invention is based on the following discoveries.

(1) When an aluminum alkoxide is dissolved in an organic solvent, carbon is dispersed therein, and water is added thereto for the hydrolysis of the aluminum alkoxide, it is possible to obtain a uniform mixture of highly pure aluminum hydroxide or alumina and carbon having a particle size of at most 0.1 μm.

Namely, a highly pure aluminum alkoxide is readily obtainable, and fine powder of carbon containing no substantial metal impurities is likewise available at a low cost. Thus, a highly pure mixture is obtainable. Further, when carbon powder having a particle size of at most 0.1 μm is used, the aluminum hydroxide or alumina formed by the hydrolysis of the aluminum alkoxide, will precipitate on the carbon powder, whereby a uniform mixture having a particle size of at most 0.1 μm is obtainable.

(2) Since the mixture is composed of fine particles having a particle size of at most 0.1 μm and is highly pure, it is possible to obtain highly pure fine powder of aluminum nitride having a particle size of at most 1 μm by heating the mixture in a nitrogen atmosphere at a low temperature of 1650° C. or lower.

(3) Since the starting material is uniformly mixed fine powder, it is possible to complete the reduction-nitriding reaction with a very small amount of excess carbon, whereby it is possible to maintain the amount of the remaining carbon in the aluminum nitride powder at a level of not higher than 2% by weight. Accordingly, no after-treatment for the removal of carbon is required, and no unreacted substance remains. Thus, the obtained fine powder is suitable for use as a starting material for a sintered product.

As the starting material aluminum alkoxide, there may be mentioned aluminum ethoxide, aluminum isopropoxide or aluminum butoxide. As the organic solvent, there may be mentioned an alcohol capable of dissolving the alkoxide, such as ethanol, propanol or butanol. As the carbon powder, it is preferred to employ a highly pure carbon powder such as carbon black, having a particle size of at most 0.1 μm. If the particle size exceeds 0.1 μm, it becomes difficult to obtain a uniform fine mixture, and there will be a drawback that carbon is required in an amount greater than the calculated amount to complete the reaction. Consequently, a substantial amount of carbon will remain in the resulting powder, and after-treatment for the removal of the remaining carbon will be required. The molar ratio of carbon to the aluminum alkoxide is preferably from 3/2 to 3.3/2. The aluminum alkoxide produces alumina or aluminum hydroxide by the hydrolysis. In most cases, it turns into aluminum hydroxide (AlOOH or Al(OH)₃.

The reduction-nitriding reaction of aluminum hydroxide is represented by the following formulas:

$$2AlOOH + 3C + N_2 \rightarrow 2AlN + 3CO + H_2O \quad (1)$$

$$2Al(OH)_3 + 3C + N_2 \rightarrow 2AlN + 3CO + 3H_2O \quad (2)$$

Since 1 mol of aluminum hydroxide forms from 1 mol of the aluminum alkoxide, the molar ratio of carbon to the aluminum alkoxide is preferably from 3/2 to 3.3/2. If the molar ratio of carbon to the aluminum alkoxide is less than 3/2, carbon will be inadequate to complete the reduction-nitriding reaction. On the other hand, if the ratio is greater than 3.3/2, the amount of remaining carbon increases, and after-treatment for the removal of carbon will be required.

More specifically, an aluminum alkoxide is dissolved in an organic solvent of an amount of from 3 to 15 times by weight, and carbon powder is dispersed therein within the above-mentioned range. Water is added thereto in a molar ratio of from 2 to 20 times relative to the aluminum alkoxide. The solution thereby obtained is gradually heated, and the hydrolysis of aluminum alkoxide is completed. Then, water, the alcohol and the solvent are removed by heating the reaction mixture under reduced pressure, whereby a mixture of carbon and aluminum hydroxide or alumina having a particle size of from 0.05 to 0.1 μm, is obtainable.

This mixture is molded, and then heated in a nitrogen gas atmosphere at a temperature of from 1400° to 1650° C. for from 1 to 30 hours, whereby fine powder of aluminum nitride is obtained. If the heating temperature is lower than 1400° C., it takes a long time to complete the reaction, and thus is not practical. On the other hand, the reaction can be conducted at a temperature exceeding 1650° C., but such a high temperature is not required. Therefore, the temperature is preferably not higher than 1650° C. The most preferred range is from 1450° to 1550° C. The heating time will be longer at a low temperature, and it is preferably from 5 to 30 hours at a temperature of 1400° C., or from 1 to 6 hours at a temperature of 1500° C.

According to the second embodiment, fine powder of aluminum nitride having a particle size of from 0.05 to 1.0 μm can be readily obtained with the remaining carbon of not more than 2% by weight.

According to the third embodiment, carbon powder is dispersed in a silicon alkoxide, the dispersion thereby obtained is hydrolyzed, and the mixture of silica and carbon thereby obtained is heated in a gas mixture of nitrogen and argon, or while alternately supplying nitrogen gas and argon gas, at a temperature of from 1350° to 1550° C. for from 30 minutes to 30 hours, whereby a fine powder mixture of silicon nitride and silicon carbide is obtainable.

This third embodiment of the invention is based on the following discoveries.

(1) When carbon powder, preferably fine carbon powder having a particle size of at most 0.1 μm, is dispersed in a silicon alkoxide, and the dispersion thereby obtained is hydrolyzed to obtain a powder mixture of silica and carbon, it is possible to readily obtain a uniform mixture of highly pure silica and carbon having a particle size of at most 0.1 μm.

Namely, the silicon alkoxide having a high purity can readily be obtained by distillation. On the other hand, fine powder of carbon containing no substantial impurities, is likewise available at a low cost. Thus, a highly pure mixture is obtainable. Further, silica having a particle size of at most 0.1 μm formed by the hydrolysis, will precipitate on carbon, whereby uniformly mixed fine particle of silica and carbon are obtainable.

(2) When the fine powder mixture of silica and carbon is heated in an atmosphere of a gas mixture of nitrogen and argon, or while supplying nitrogen gas and argon gas alternately, the weight ratio of the silicon carbide to silicon nitride can be optionally controlled within a wide range of from 1/19 to 19/1 by controlling the atmosphere and the heating conditions.

As the starting mixture is a fine uniform mixture, the reaction can be completed without excess carbon, whereby the amount of carbon remaining after the reaction is limited to a level of at most 1.5% by weight, and no after-treatment for its removal is required.

(3) Since the mixture is a uniform mixture of fine particles having a particle size of at most 0.1 μm, the reaction can be completed at a temperature of not higher than 1550° C., and the resulting fine powder is obtainable also in the form of a uniform mixture having a particle size of at most 1 μm, which has excellent sinterability and can be made into a highly dense sintered product.

As the starting material silicon alkoxide, there may be employed methyl silicate, ethyl silicate, propyl silicate or butyl silicate. As the carbon powder, it is preferred to employ highly pure carbon powder such as carbon black, having a particle size as fine as at most 0.1 μm. If the particle size exceeds 0.1 μm, it becomes difficult to obtain a uniform fine mixture, and it will be necessary to use carbon in an amount greater than the calculated amount to complete the reaction. Consequently, there will be substantial amount of carbon remaining in the formed mixture of silicon nitride and silicon carbide, and it will be required to remove the remaining carbon. Therefore, the particle size is preferably as defined above.

The molar ratio of carbon to the silicon alkoxide is preferably within a range of from 1.7 to 2.8. The silicon alkoxide turns into silica by the hydrolysis, and the yield is at least 99.8%. Therefore, the ratio of carbon to the silicon alkoxide corresponds to the ratio of carbon to silica.

The ratio of silicon carbide to silicon nitride in the powder so prepared, may be changed by controlling (1) the ratio of carbon to the silicon alkoxide as the starting materials, (2) the ratio of argon to nitrogen in the heating atmosphere, or (3) the heating temperature and time in the atmosphere when nitrogen and argon are supplied alternately, and the ratio of silicon carbide to silicon nitride can be controlled within a wide range of from 1/19 to 19/1.

The silica and carbon obtained by the hydrolysis will then react with nitrogen to form silicon nitride.

$$3SiO_2 + 6C + 2N_2 \rightarrow Si_3N_4 + 6CO \tag{1}$$

On the other hand, they produce SiC in an argon atmosphere.

$$SiO_2 + 3C \rightarrow SiC + 2CO \tag{2}$$

Further the following reaction to form SiO gas takes place simultaneously, whereby silica is discharged out of the system.

$$SiO_2 + C \rightarrow SiO + CO \tag{3}$$

In the reaction (3), silica and carbon will be consumed in a molar ratio of 1:1.

In the reaction (1) for the formation of silicon nitride, silica and carbon are consumed in a molar ratio of 1:2. Whereas in the reaction (2) for the formation of silicon carbide, silica and carbon are consumed in a molar ratio of 1:3. Accordingly, the ratio of carbon to silica corresponding to the ratio of the silicon carbide to silicon nitride is adjusted so that the amount of the remaining carbon will be not greater than 1.5% by weight. The molar ratio of carbon to silica is within a range of from 1.7 to 2.8, as mentioned above. In order to increase the ratio of silicon nitride in the powder, the amount of carbon is reduced. On the other hand, to increase the ratio of silicon carbide, the amount of carbon is increased. If the amount of carbon is smaller than the molar ratio of carbon to silica of 1.7, the reaction will be inadequate, and the starting material silica will remain. On the other hand, the molar ratio of carbon to silica exceeds 2.8, the reaction proceeds smoothly, but excess carbon will remain.

More specifically, a predetermined amount of carbon is dispersed in a silicon alkoxide, distilled water is added in an amount of from 3 to 4 times by weight of the silicon alkoxide, and an acid such as hydrochloric acid or nitric acid, or an aqueous alkaline solution such as aqueous ammonia, is dropwise added in a small amount, and the mixture is heated at a temperature of 80° C. for 5 hours, whereby the hydrolysis is completed. The formed alcohol and water are separated by heating the mixture at a temperature of from 50° to 90° C. under a reduced pressure of from 10 to 200 Torr, whereby fine powder mixture of dried silica and carbon is obtainable. This powder is a uniform mixture of fine particles having a particle size of at most 0.1 μm, and was confirmed to be amorphous by the X-ray diffraction.

The mixture thereby obtained is molded, if necessary, and heated in a gas mixture of nitrogen and argon, or while supplying nitrogen and argon alternately, at a temperature of from 1350° to 1550° C., whereby fine powder mixture of silicon nitride and silicon carbide is obtainable.

When a gas mixture of nitrogen and argon is to be used, it is preferred to employ a mixture comprising from 5 to 50% by volume of nitrogen and from 95 to 50% by volume of argon. In order to obtain a powder having greater amount of silicon nitride, the ratio of nitrogen gas is increased. In order to obtain a powder containing a greater amount of silicon carbide, the ratio of argon gas is increased. If the nitrogen gas is less than 5% by volume, the ratio of silicon carbide increases beyond the ratio of the silicon carbide to silicon nitride of 19/1. On the other hand, if the nitrogen gas exceeds 50% by volume, the silicon nitride increases beyond the ratio of silicon carbide to the silicon nitride of 1/19. In either case, it becomes difficult to control the ratio.

In the case where nitrogen gas and argon gas are supplied alternately, silicon nitride is first synthesized by the heating in the nitrogen gas, followed by the synthesis of the silicon carbide by the heating in the argon gas, or the order of the synthesis may be reversed. In the heating in the argon gas or in the nitrogen gas, the higher the heating temperature or the longer the heating time, the higher the ratio of the silicon carbide or the silicon nitride becomes.

The heating temperature is preferably from 1350° to 1550° C., and the heating time is preferably from 30 minutes to 20 hours in the gas mixture, or a total of from 1 to 30 hours in the case where the two gases are supplied alternately. If the heating temperature is lower than 1350° C., the reaction does not proceed adequately, and if the temperature exceeds 1550° C., the reaction of the above formula (3) will be active, and the evaporation of SiO will increase, whereby it will be difficult to control the remaining carbon in the formed powder. The amount of the remaining carbon is preferably at most 1.5% by weight.

A mixture having a weight ratio of the silicon carbide to the silicon nitride of from 1/19 to 19/1, can be sintered under normal pressure by using a sintering additive in the same manner as in the case of silicon nitride. If the ratio of silicon carbide increases beyond the range, it will be necessary to sinter the mixture under a high temperature and high pressure condition by means of hot-pressing.

Now, the present invention will be described in further detail with reference to Examples. However, it should be understood that the present invention is by no means restricted to these specific Examples.

EXAMPLE 1

11 g of carbon black having an average particle size of 0.07 μm was dispersed in 132 g of propyl silicate by imparting ultrasonic vibration, and 400 g of distilled water and then 30 cc of aqueous ammonia (50%) were added thereto and mixed for 2 hours. This mixture was heated at 80° C. for 5 hours to complete the hydrolysis of propyl silicate. The mixture was cooled, and heated gradually to 90° C. under reduced pressure to remove water and formed propyl alcohol. The powder thereby obtained, was maintained in air at 100° C. for 10 hours, whereby a uniform mixture of silica and carbon was obtained. By the observation with a transmission-type electromicroscope, the silica was found to be amorphous and its particle size was about 0.02 μm.

1 g of the powder mixture thus obtained was put into a mold having a diameter of 12 mm, and molded into a pellet under a pressure of 300 kg/cm$^2$. The pellet was placed on an alumina boat, and heated in an alumina tube in a nitrogen stream at a temperature of 1450° C. for 8 hours. The powder thereby obtained was composed of α-Si$_3$N$_4$ and a small amount of β-Si$_3$N$_4$. The average particle size was 0.9 μm. The remaining carbon in the powder was 0.8% by weight, and the oxygen content was 1.2% by weight.

EXAMPLE 2

Carbon powder having a particle size of 0.07 μm and a non-oxide ceramics powder having a particle size of at most 1 μm were added to 104.2 g of ethyl silicate in a proportion as identified in Table 1, and silicon nitride powder was prepared under the same conditions as in Example 1 except for the conditions specified in Table 1.

The silicon nitride powder thereby obtained had a particle size of at most 1 μm, and the remaining carbon and the oxygen content were not more than 1.5% by weight in each case. When compared with Example 1, it is evident that the heating time as a heating condition for the preparation of silicon nitride can be shortened.

TABLE 1

| | | | | | |
|---|---|---|---|---|---|
| Carbon/Ethyl silicate (molar ratio) | 1.9 | 1.8 | 2.0 | 2.0 | 2.1 |
| Non-oxide ceramics | SiC | Si$_3$N$_4$ | AlN | TiN | TiC |
| Non-oxide ceramics/ Formed silica (weight ratio) | 0.03 | 0.03 | 0.04 | 0.05 | 0.05 |
| Heating condition | | | | | |
| Temperature (°C.) | 1450 | 1400 | 1450 | 1500 | 1500 |
| Time (hr) | 4 | 8 | 4 | 2 | 3 |
| Formed silicon nitride powder | | | | | |
| Average particle size (μm) | 0.5 | 0.3 | 0.6 | 0.9 | 0.8 |
| Remaining carbon (wt. %) | 1.1 | 0.8 | 1.5 | 1.3 | 1.2 |
| Oxygen content (wt. %) | 0.8 | 0.9 | 1.2 | 1.5 | 1.4 |

EXAMPLE 3

40 g of aluminum ethoxide was dissolved in 200 g of isobutanol, and 4.5 g of carbon black having an average particle size of 0.07 μm was dispersed therein. Then, 40 g of distilled water was added thereto, and the mixture was maintained at 50° C. for 3 hours to complete the hydrolysis. The mixture was gradually heated to a temperature of 90° C. under a reduced pressure of 100 Torr to remove water and the alcohol. The powder thereby obtained was composed of amorphous aluminum hydroxide, AlOOH and carbon black.

1.5 g of this powder was pressed in a cylindrical mold having a diameter of 12 mm under a pressure of 300 kg/cm$^2$ to form a pellet. This pellet was placed on an alumina boat, and heated in a furnace comprising an alumina tube and a heater made of silicon carbide, in a nitrogen stream at a temperature of 1450° C. for 8 hours. The resulting powder was examined by X-ray diffraction, whereby no alumina was detected and the powder was composed solely of aluminum nitride. The average particle size of the powder was 0.6 μm, and the amount of the remaining carbon was 1.6% by weight.

EXAMPLE 4

Fine powder of aluminum nitride was prepared in the same manner as in Example 3 from 52 g of aluminum isopropoxide, 300 g of isobutanol and 5 g of carbon black, except that the reduction-nitriding reaction was conducted by heating in a nitrogen stream at 1500° C. for 6 hours. The fine powder thereby obtained was examined by X-ray diffraction, whereby no alumina was detected, and the powder was composed solely of aluminum nitride. The fine powder had an average particle size of 0.8 μm, and the amount of the remaining carbon was 1.2% by weight.

COMPARATIVE EXAMPLE 1

In a ball mill made of a sintered silicon carbide, 4.5 g of carbon black having an average particle size of 0 07 μm was mixed with 25 g of alumina having an average particle size of 0.6 μm for 3 hours with use of hexane as a dispersing agent. After drying, the mixture was subjected to the reduction-nitriding reaction in the same manner as in Example 3. The weight ratio of alumina to aluminum nitride in the formed powder was 12/88, and thus unreacted alumina remained. Further, the remaining carbon was 3.2% by weight.

EXAMPLE 5

17 g of carbon black having an average particle size of 0.07 μm was added to 104 g of ethyl silicate and dispersed by imparting ultrasonic vibration, and 280 cc of distilled water and 35 cc of aqueous ammonia (50%) were added and mixed for 2 hours. Then, the solution of the mixture was heated at 80° C. for 5 hours for hydrolysis to obtain a mixture of silica and carbon. The mixture was heated to 90° C. under a reduced pressure of 100 Torr to remove water and the alcohol formed by the hydrolysis. Then, the mixture was maintained at 100° C. for 5 hours to obtain a powder mixture of silica and carbon. Then, 1 g of the powder mixture was pressed in a mold having a diameter of 12 mm under a pressure of 300 kg/cm$^2$ to obtain a disc-shaped pellet. The pellet was heated in a mixed atmosphere comprising 10% by volume of nitrogen and 90% by volume of argon at 1450° C. for 5 hours.

The powder thereby obtained was found to be a uniform powder mixture comprising 72% by weight of silicon nitride and 28% by weight of silicon carbide, by the X-ray diffraction, and the average particle size was 0.8 μm. The powder was black, and the amount of the remaining carbon after heating the powder in air at 600° C. for 2 hours, was 0.9% by weight.

To the powder mixture of silicon nitride and silicon carbide thereby obtained, 5% by weight of MgO was added, and mixed for 2 hours in hexane by means of a ball mill made of silicon carbide. The mixture was dried, and pressed in a mold having an internal diameter of 16 mm under a pressure of 300 kg/cm$^2$ to form a disc. The disc was further pressed by isostatic press under a pressure of 2 ton/cm$^2$. This pellet was placed in a crucible made of a sintered BN and covered with silicon nitride powder, and heated in a nitrogen atmosphere of 5 atm at 1850° C. for 1 hour, whereby a sintered product having a density of 3.20 g/cm$^3$ (porosity: 1.5%) was obtained. The sintered product had a heat conductivity of 41 W/m.K at room temperature as measured by a laser flash method, which is higher than 32 W/m.K of a sintered product of silicon nitride.

EXAMPLE 6

A mixture of silica and carbon was prepared in the same manner as in Example 5 from 12 g of carbon black and 132 g of propyl silicate, and the mixture was pelletized. The pellet thereby obtained was heated in argon at 1450° C. for 1 hour, and then heated in a nitrogen atmosphere at 1500° C. for 7 hours. The powder thereby obtained was composed of 85% by weight of silicon nitride and 15% by weight of silicon carbide, had an average particle size of 0.5 μm, and was grey, and the amount of the remaining carbon was 0.2% by weight.

To this powder, 5% by weight of Y$_2$O$_3$ was added, and a pellet was prepared in the same manner as in Example 5. The pellet was sintered in a nitrogen atmosphere at 1750° C. for 1 hour. The sintered product had a density of 3.15 g/cm$^3$ (porosity 3.2%), and the heat conductivity at room temperature was 37 W/m.K.

EXAMPLE 7

A powder mixture of silica and carbon was prepared in the same manner as in Example 5 by dispersing 18 g of carbon black in 104 g of ethyl silicate, and the powder mixture was pelletized. The pellet was heated in a nitrogen atmosphere at 1450° for 2 hours, and then in an argon gas at 1500° C. for 6 hours, whereby a powder mixture of silicon nitride and silicon carbide was obtained. The powder mixture thereby obtained was composed of 60% by weight of silicon nitride and 40% by weight of silicon carbide, had an average particle size of 0.9 μm, and was black, and the remaining carbon was 0.7% by weight.

To this powder, 5% by weight of MgO was added, and mixed in the same manner as in Example 5. Then, 1.5 g of this mixture was placed in a graphite mold having a diameter of 15 mm and coated on the internal surface with BN powder, and heated in a nitrogen stream under a pressure of 200 kg/cm$^2$ at 1750° C. for 1 hour to obtain a sintered product. The sintered product had a density of 3.25 g/cm$^3$ (porosity: 0.4%), and the heat conductivity at room temperature was 51 W/m.K.

COMPARATIVE EXAMPLE 2

In a ball mill made of silicon carbide, 17 g of carbon black having an average particle size of 0.07 μm was mixed with 30 g of silica powder having an average particle size of 0.08 μm for 2 hours. (The molar ratio of carbon to silica was the same as in Example 5.) The mixture was dried, and a powder mixture of silicon nitride and silicon carbide was prepared in the same manner as in Example 5. The powder thereby obtained was composed of 66% by weight of silicon nitride and 34% by weight of silicon carbide, had an average particle size of 1.2 μm, and was black, and the remaining carbon was 3.6% by weight. This powder mixture was molded and sintered in the same manner as in Example 5. The density of the sintered product was 2.84 g/cm³ (porosity: 12.1%), and the heat conductivity at room temperature was 12 W/m.K. The density and the heat conductivity were substantially lower than the sintered product of silicon nitride, and the properties of the powder mixture were not satisfactory.

COMPARATIVE EXAMPLE 3

Silicon nitride powder having an average particle size of 0.7 μm and silicon carbide powder having an average particle size of 0.5 μm were mixed in a weight ratio of 60:40. (The weight ratio of silicon nitride and silicon carbide was the same as the one prepared in Example 7.) To this mixture, 5% by weight of MgO was added, and mixed in hexane for 2 hours by means of a ball mill made of silicon carbide. The mixture was dried, and a sintered product was prepared in the same manner as in Example 7. The sintered product had a density of 2.93 g/cm³ porosity 10.1%) The heat conductivity at room temperature was 25 W/m.K. As compared with the sintered product obtained in Example 7, the density and the heat conductivity were low.

What is claimed is:

1. A process for producing fine non-oxide powder from an alkoxide selected from the group consisting of a silicon alkoxide and an aluminum alkoxide, which comprises dispersing carbon powder in the alkoxide, hydrolyzing the dispersion, and heating the hydrolyzate mixture thereby obtained, in a nitrogen atmosphere at a temperature of from 1350° C. to 1650° C. for from 30 minutes to 30 hours.

2. The process according to claim 1, wherein carbon powder is dispersed in a silicon alkoxide, then the dispersion is hydrolyzed, and a mixture of silica and carbon thereby obtained is heated at a temperature of from 1350° to 1550° C. in a nitrogen atmosphere for from 1 to 30 hours to obtain fine powder of silicon nitride.

3. The process according to claim 2, wherein the molar ratio of the carbon powder to the silicon alkoxide is from 1.7 to 2.1.

4. The process according to claim 1, wherein carbon powder and non-oxide ceramics powder are dispersed in a silicon alkoxide, then the dispersion is hydrolyzed, and a mixture of silica, carbon and non-oxide ceramics thereby obtained is heated at a temperature of from 1350° to 1550° C. for from 1 to 10 hours in a nitrogen atmosphere to obtain fine powder of silicon nitride.

5. The process according to claim 4, wherein the non-oxide ceramics powder is selected from the group of powders of SiC, $Si_3N_4$, AlN, TiN and TiC, and has a particle size of at most 1 μm, and it is used in an amount of from 1 to 5% by weight relative to silica.

6. The process according to claim 4, wherein the molar ratio of the carbon powder to the silicon alkoxide is from 1.7 to 2.1.

7. The process according to claim 1, wherein an aluminum alkoxide is dissolved in an organic solvent, carbon powder is dispersed in the solution of the aluminum alkoxide, water is added to the solution to hydrolyze the aluminum alkoxide, a powder mixture of aluminum hydroxide or alumina and carbon thereby obtained is heated in a nitrogen atmosphere at a temperature of from 1400° to 1650° C. for from 1 to 30 hours.

8. The process according to claim 7, wherein the molar ratio of the carbon powder to the aluminum alkoxide is from 3/2 to 3.3/2.

9. The process according to claim 1, wherein carbon powder is dispersed in a silicon alkoxide, then the dispersion is hydrolyzed, and a mixture of silica and carbon thereby obtained, is heated in a gas mixture of nitrogen and argon, or while alternately supplying nitrogen gas and argon gas, at a temperature of from 1350° to 1550° C. for from 30 minutes to 30 hours to obtain fine powder mixture of silicon nitride and silicon carbide.

10. The process according to claim 9, wherein the mixture of silica and carbon is heated in an argon gas containing from 5 to 50% by volume of nitrogen at a temperature of from 1350° to 1550° C. for from 30 minutes to 20 hours.

11. The process according to claim 9, wherein the mixture of silica and carbon is heated in an argon stream at a temperature of from 1350° to 1550° C. for from 1 minute to 10 hours, and then in a nitrogen stream at a temperature of from 1400° to 1550° C. for from 1 to 20 hours.

12. The process according to claim 9, wherein the mixture of silica and carbon is heated in a nitrogen stream at a temperature of from 1350° to 1500° C. for from 1 minute to 10 hours and then in an argon stream at a temperature of from 1400° to 1550° C. for from 1 to 20 hours.

13. The process according to claim 9, wherein the molar ratio of carbon to silica in the mixture obtained by the hydrolysis of the silicon alkoxide is from 1.7 to 2.8.

* * * * *